(12) United States Patent
Takahashi et al.

(10) Patent No.: US 10,797,413 B2
(45) Date of Patent: Oct. 6, 2020

(54) TERMINAL-EQUIPPED ELECTRICAL WIRE AND WIRING MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hideo Takahashi, Yokkaichi (JP); Shinichi Takase, Yokkaichi (JP); Hiroki Shimoda, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 217 days.

(21) Appl. No.: 15/755,301

(22) PCT Filed: Sep. 16, 2016

(86) PCT No.: PCT/JP2016/077408
§ 371 (c)(1),
(2) Date: Feb. 26, 2018

(87) PCT Pub. No.: WO2017/047738
PCT Pub. Date: Mar. 23, 2017

(65) Prior Publication Data
US 2018/0248280 A1    Aug. 30, 2018

(30) Foreign Application Priority Data
Sep. 18, 2015    (JP) .................................. 2015-185092

(51) Int. Cl.
*H01M 2/00*    (2006.01)
*H01M 2/02*    (2006.01)
(Continued)

(52) U.S. Cl.
CPC ............ *H01R 11/12* (2013.01); *H01M 2/206* (2013.01); *H01M 2/305* (2013.01); *H01R 4/183* (2013.01);
(Continued)

(58) Field of Classification Search
None
See application file for complete search history.

(56) References Cited

U.S. PATENT DOCUMENTS

2012/0015550 A1    1/2012    Ikeda et al.
2012/0038365 A1*   2/2012    Nagata .................. H01M 2/206
                                                    324/433

FOREIGN PATENT DOCUMENTS

JP    2011198514 A    10/2011
JP    5657179 B1      1/2015

OTHER PUBLICATIONS

Machine translation of JP 2011-1985140041 (Year: 2011).*
(Continued)

*Primary Examiner* — Cynthia H Kelly
*Assistant Examiner* — Julian Anthony
(74) *Attorney, Agent, or Firm* — Reising Ethington, P.C.

(57) ABSTRACT

A terminal-equipped electrical wire includes an electrical wire and a terminal that is connected to the electrical wire. The terminal includes a metal cap portion in which one end portion of a tubular portion that has a tubular shape is sealed and another end portion is an opening portion. The terminal is connected to the electrical wire in a state where the cap portion is placed over an end portion of the electrical wire.

(Continued)

An edge portion of the opening portion has an increased width in the diameter direction of the tubular portion.

10 Claims, 10 Drawing Sheets

(51) Int. Cl.
    *H01M 2/26*     (2006.01)
    *H01M 2/28*     (2006.01)
    *H01R 11/12*     (2006.01)
    *H01R 4/20*     (2006.01)
    *H01M 2/20*     (2006.01)
    *H01M 2/30*     (2006.01)
    *H01R 4/18*     (2006.01)
    *H01R 4/70*     (2006.01)

(52) U.S. Cl.
    CPC ................. *H01R 4/20* (2013.01); *H01R 4/70* (2013.01); *H01M 2220/20* (2013.01)

(56) References Cited

OTHER PUBLICATIONS

International Preliminary Report on Patentability for Application No. PCT/JP2016/077408 dated Mar. 21, 2017; 6 pages.
International Search Report for Application No. PCT/JP2016/077408 dated Oct. 25, 2016; 7 pages.

\* cited by examiner

TERMINAL-EQUIPPED ELECTRICAL WIRE AND WIRING MODULE

CROSS REFERENCE TO RELATED APPLICATIONS

This application claims the priority of Japanese patent application JP2015-185092 filed on Sep. 18, 2015, the entire contents of which are incorporated herein.

TECHNICAL FIELD

The technology disclosed in the present specification relates to a terminal-equipped electrical wire and a wiring module using the same.

BACKGROUND ART

Conventionally, Patent Document 1 (JP2011-198514A) discloses a terminal-equipped electrical wire that includes an electrical wire and a terminal that is connected to the electrical wire. In this terminal-equipped electrical wire, the electrical wire is obtained by coating a core wire with an insulation covering, and a metal cap is placed over the core wire of the electrical wire. In the state where the cap has been placed on the core wire, a wire barrel of the terminal is crimped so as to wrap around the cap.

SUMMARY

However, according to the above configuration, there is concern that a slight gap will form between the opening portion of the cap and the insulation covering. There is concern that a liquid will intrude into the cap through this gap due to the capillary phenomenon.

The technology disclosed in the present specification was achieved in light of the foregoing situation, and an object thereof is to suppress the intrusion of a liquid into the cap portion.

The technology disclosed in the present specification pertains to a terminal-equipped electrical wire including an electrical wire and a terminal that is connected to the electrical wire, wherein the terminal includes a metal cap portion in which one end portion of a tubular portion that has a tubular shape is sealed and another end portion of the tubular portion is an opening portion, the terminal is connected to the electrical wire in a state where the cap portion is placed over an end portion of the electrical wire, and a portion toward an edge of the opening portion has an increased width in a diameter direction of the tubular portion.

According to the above configuration, the portion toward the edge of the opening portion of the cap portion has an increased width in the diameter direction of the tubular portion, and therefore a gap is formed between the opening portion of the cap portion and the electrical wire. The capillary phenomenon is suppressed by this gap. This consequently suppresses the case where a liquid intrudes into the cap portion through the gap between the opening portion of the cap portion and the electrical wire.

The following aspects are preferable as aspects for carrying out the technology disclosed in the present specification.

An edge portion of the opening portion is bent outward in the diameter direction of the tubular portion.

According to the above configuration, the capillary phenomenon is reliably suppressed in the gap between the electrical wire and the edge portion of the opening portion of the cap portion.

The cap portion is a member that is separate from the terminal, and the terminal has a wire barrel that is crimped in a state of wrapping around the cap portion.

According to the above configuration, the wire barrel is crimped to the cap portion, thus electrically connecting the core wire and the terminal to each other.

The cap portion is integrated with the terminal as a single body.

According to the above configuration, the number of parts can be reduced compared to the case where the terminal and the cap portion are separate members.

The terminal has a connection portion that is to be connected to a connection partner, and the connection portion and the cap portion are electrically connected.

According to the above configuration, the connection partner and the electrical wire can be electrically connected to each other.

The connection portion is to be connected to an electrode terminal of a power storage element.

According to the above configuration, the electrode terminal of the power storage element and the electrical wire can be electrically connected to each other.

The connection portion connects electrode terminals of power storage elements to each other.

According to the above configuration, the electrode terminals of power storage elements can be electrically connected to each other, and the electrode terminals and the electrical wire can be electrically connected to each other.

The technology disclosed in the present specification pertains to a wiring module including: the above-described terminal-equipped electrical wire; and an insulating protector having a housing portion that houses the connection portion.

According to the technology disclosed in the present specification, the intrusion of a liquid into the cap portion is suppressed.

DESCRIPTION OF EMBODIMENTS

First Embodiment

A first embodiment in which a terminal-equipped electrical wire 11 disclosed in the present specification is applied to a wiring module 10 will be described below with reference to FIGS. 1 to 4. The wiring module 10 according to the present embodiment is for attachment to a power storage element group 52 in which multiple power storage elements 50 are arranged side-by-side. A power storage module 12 is obtained by attaching the wiring module 10 to the power storage element group 52, and is installed in and used as a power supply in a vehicle (not shown) such as an electric automobile or a hybrid automobile.

Figure 1:
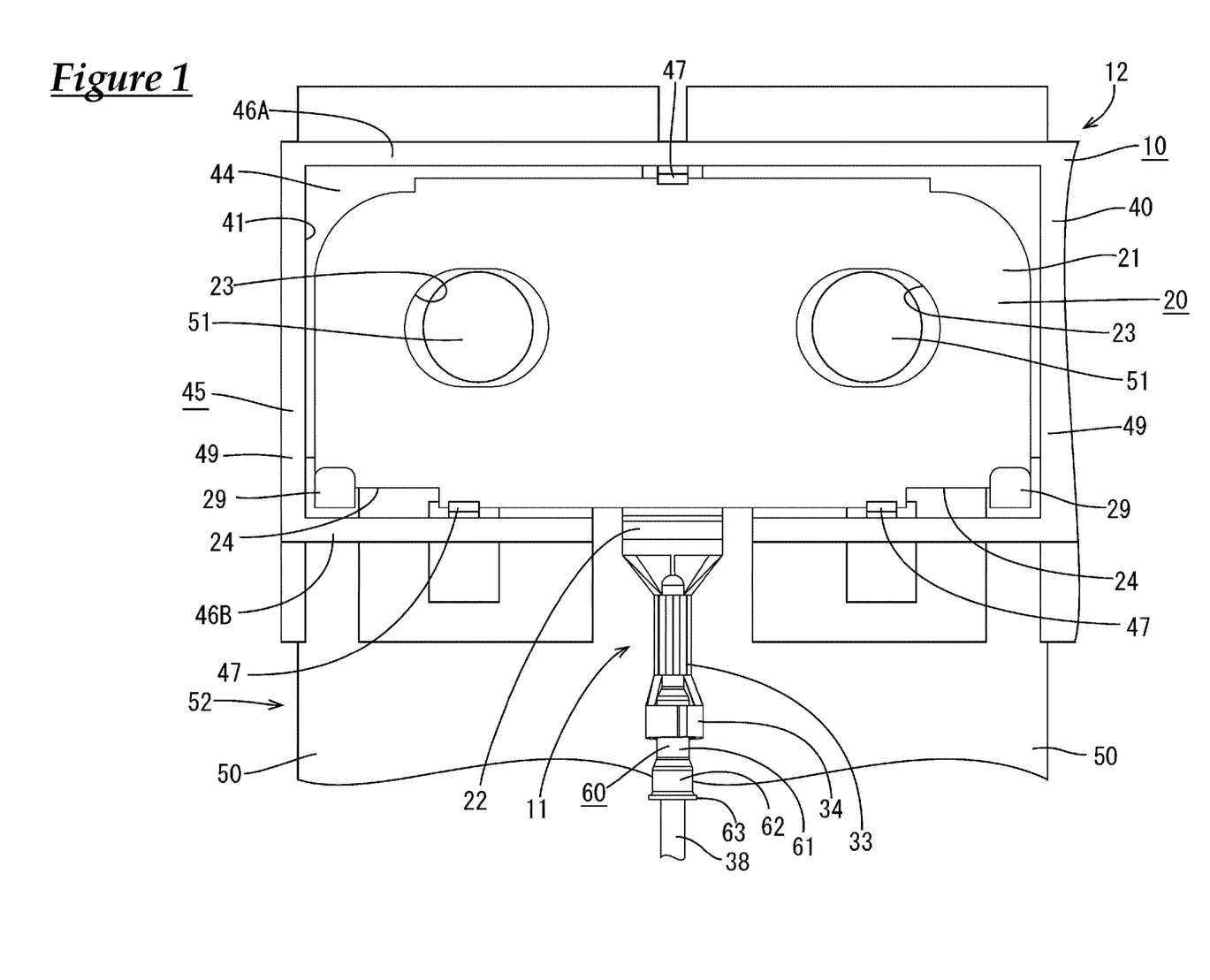
FIG. 1 is a plan view showing a wiring module according to a first embodiment.

As shown in FIG. 1, the power storage elements 50 each have a flattened cuboid shape. A bolt-shaped electrode terminal 51 projects from one end portion of each of the power storage elements 50.

Wiring Module 10

The wiring module 10 includes multiple terminal-equipped electrical wires 11 and an insulating protector 40 that houses the terminal-equipped electrical wires 11.

Terminal-Equipped Electrical Wire 11

Figure 2:
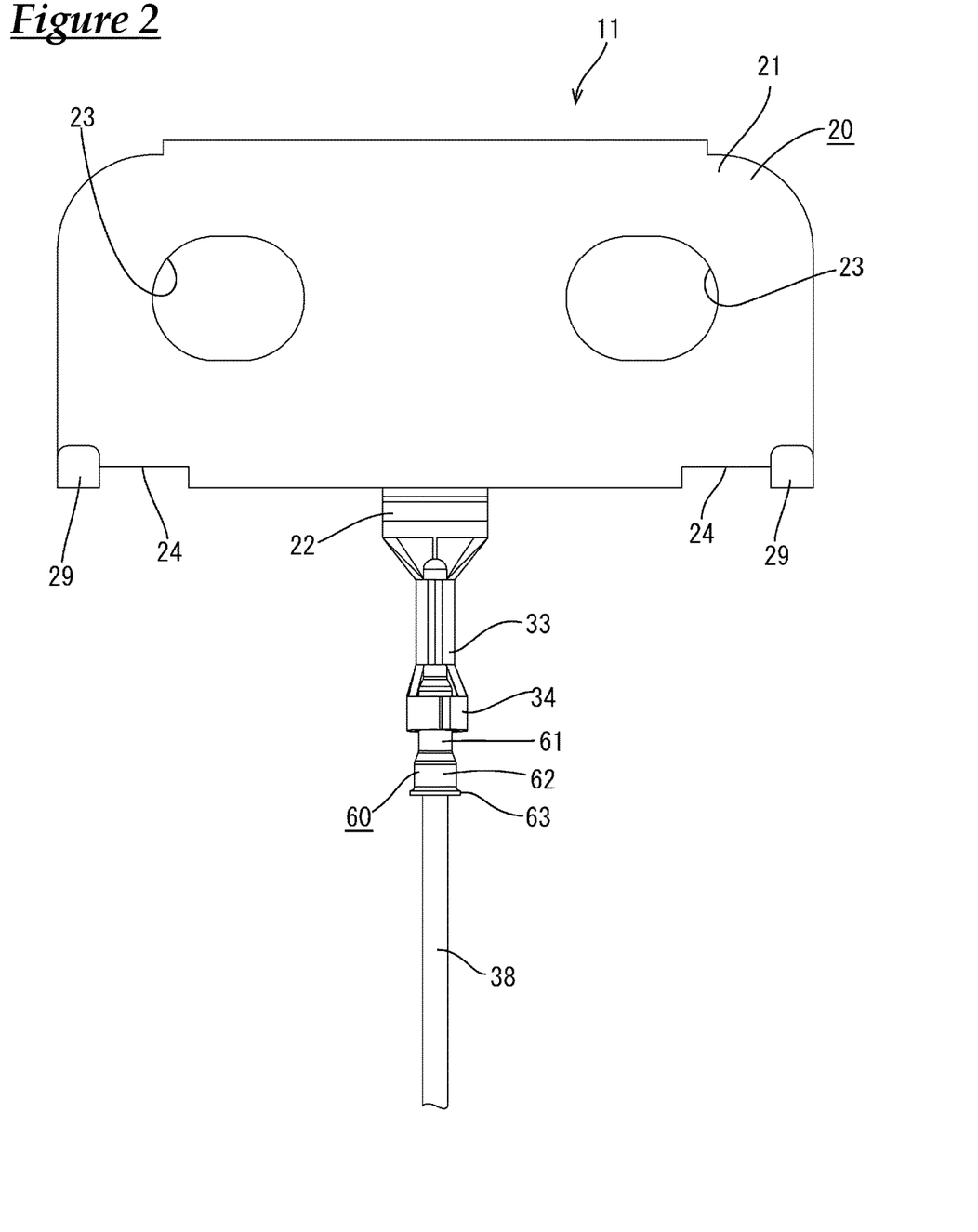
FIG. 2 is a plan view showing a terminal-equipped electrical wire according to the first embodiment.
Figure 3:
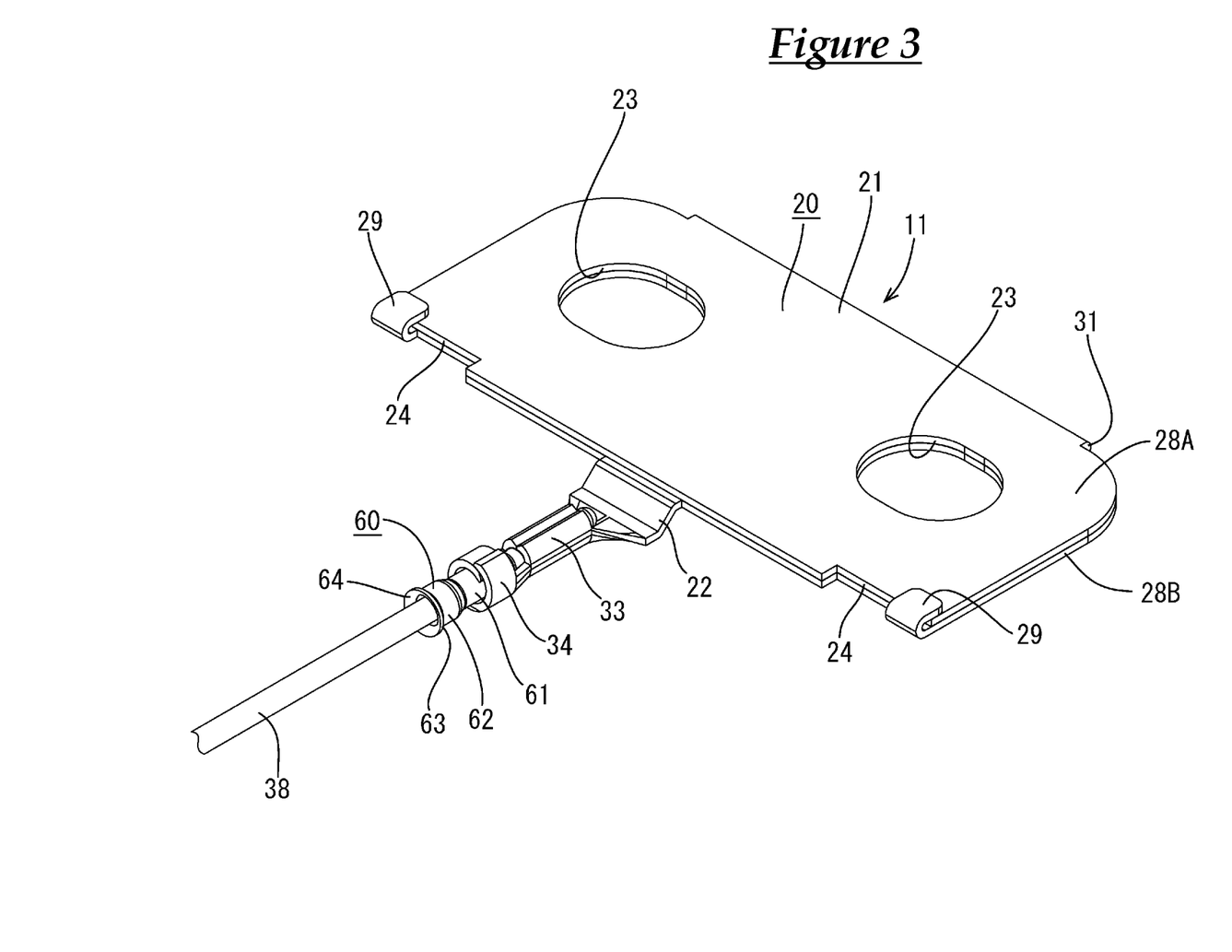
FIG. 3 is a perspective view showing the terminal-equipped electrical wire.

A terminal 20 is made of a metal, and any metal can be appropriately selected as necessary as the metal that constitutes the terminal 20, examples of which include copper, a copper alloy, aluminum, an aluminum alloy, and stainless steel (SUS). As shown in FIG. 2, the terminal 20 includes a plate-shaped connection portion 21, a wire barrel 33 that is continuous with the connection portion 21, an insulation barrel 34 that is continuous with the wire barrel 33, and a cap portion 60 that is crimped to the wire barrel 33 in a state of being placed on a core wire of an electrical wire 38.

The connection portion 21 is approximately shaped as a rectangle that is elongated in the horizontal direction, and connects adjacent electrode terminals 51 to each other. The connection portion 21 and the wire barrel 33 are joined by a joining portion 22. The upper corner portions of the connection portion 21 have a rounded shape. Recessed portions 24, which are each shaped as a rectangular cutout, are respectively formed at positions toward the left and right end portions of the lower end portion of the connection portion 21.

The connection portion 21 is formed by stacking a pair of thin flat plate portions 28A and 28B that are shaped as flat plates, and the flat plate portions 28A and 28B are connected by a hinge portion 31. Note that the flat plate portions 28A and 28B are made thin because the wire barrel 33 is formed as a single piece therewith, thus requiring a thickness that allows the wire barrel 33 to be crimped to the core wire, and two flat plate portions 28A and 28B are stacked in order to reduce electrical resistance by increasing the thickness of the connection portion 21.

A pair of left and right through-holes 23 are formed in the connection portion 21 in correspondence with the distance between the electrode terminals 51. The through-holes 23 are shaped as an ellipse that is elongated in the left-right direction (electrode terminal 51 connection direction), and the electrode terminals 51 can be inserted through the through-holes 23 with a predetermined clearance in the left-right direction.

The terminal 20 is obtained by using a pressing machine to perform punching processing on a metal plate member so as to obtain a spread-out shape in which the pair of flat plate portions 28A and 28B are connected by the hinge portion 31. The hinge portion 31 is then bent, the pair of flat plate portions 28A and 28B are stacked, and locking portions 29 projecting from the peripheral edge portion of the flat plate portion 28A are bent and locked to the flat plate portion 28B, thus forming the terminal 20.

The electrical wire 38 includes a core wire that is constituted by twisted metal strands, and an insulation covering that is made of an insulating synthetic resin and covers the core wire. The insulation covering is stripped to expose the core wire at the end of the electrical wire 38. In the state where the cap portion 60 is placed on the core wire, the wire barrel 33 is crimped so as to wrap around the cap portion 60. Accordingly, the cap portion 60 is crimped to the core wire. As a result, the core wire, the cap portion 60, and the wire barrel 33 portion are electrically connected to each other.

The electrical wire 38 is connected to an external ECU (Electric Control Unit) that is not shown. The ECU is provided with a microcomputer, elements, and the like, and has a known configuration including functions for detecting the voltage, current, temperature, and the like of the power storage elements 50, performing charge/discharge control of the power storage elements 50, and the like.

The insulation barrel 34 is crimped so as to wrap around the insulation covering.

The cap portion 60 is formed by performing deep drawing processing on a metal plate member, for example. Any metal can be appropriately used as necessary as the metal that constitutes the cap portion 60, examples of which include copper, a copper alloy, aluminum, and an aluminum alloy. In the cap portion 60, one end portion of a tubular portion 61 that has a tubular shape is sealed, and the other end portion is an opening portion 62. In the present embodiment, the tubular portion 61 has a cylindrical shape, but the tubular portion 61 may have a cross-sectional shape that is a polygon such as a quadrangle, a pentagon, or a hexagon, or that is an ellipse or a racetrack shape.

Figure 4:
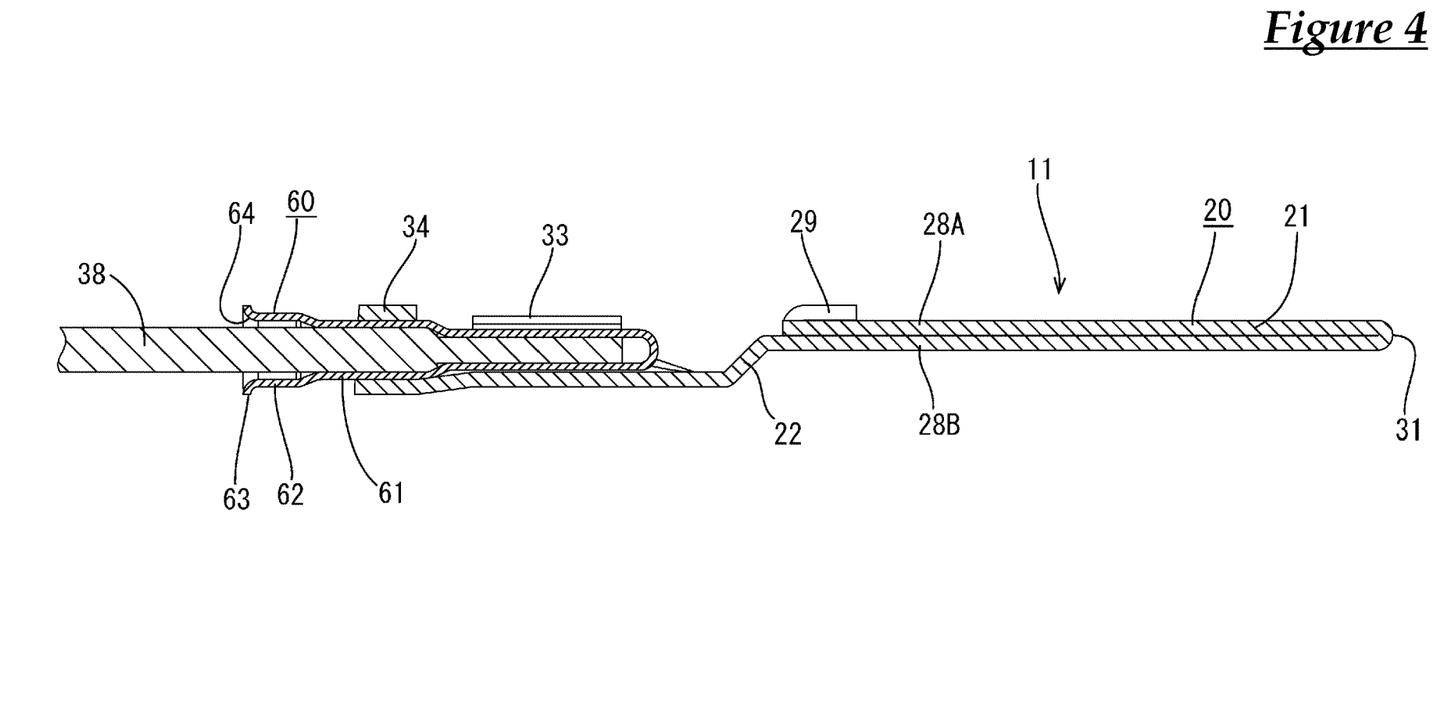
FIG. 4 is a cross-sectional view showing the terminal-equipped electrical wire.

As shown in FIG. 4, a portion of the opening portion 62 of the cap portion 60 that is toward the edge has an increased width in the diameter direction of the tubular portion 61. More specifically, the portion of the cap portion 60 that is crimped by the wire barrel 33 has the smallest diameter. The portion that is crimped to the insulation barrel 34 has a wider diameter than the portion that is crimped by the wire barrel 33. The portion of the opening portion 62 of the cap portion 60 that is toward the opening edge is wider in the diameter direction of the tubular portion 61 than the portion that is crimped by the wire barrel 33. Furthermore, an edge portion 63 of the opening portion 62 of the cap portion 60 is curved outward in the diameter direction of the tubular portion 61, thus substantially having the shape of a bell mouth. A gap 64 is therefore formed between the insulation covering of the electrical wire 38 and the opening portion 62 of the cap portion 60.

The metal that constitutes the terminal 20 and the metal that constitutes the core wire may be the same, or may be different metals. If the metal constituting the terminal 20 is the same as the metal constituting the core wire, it is preferable that the metal constituting the cap portion 60 is the same as the metal constituting the terminal 20 and the metal constituting the core wire.

If the metal constituting the terminal 20 is different from the metal constituting the core wire, the metal constituting the cap portion 60 may be the same as the metal constituting the terminal 20, may be the same as the metal constituting the core wire, or may be different from both the metal constituting the terminal 20 and the metal constituting the core wire.

If the metal constituting the cap portion 60 is different from the metal constituting the terminal 20 and the metal constituting the core wire, it is preferable that the ionization tendency of the metal constituting the cap portion 60 is between the ionization tendency of the metal constituting the terminal 20 and the ionization tendency of the metal constituting the core wire.

Insulating Protector 40

The insulating protector 40 is made of an insulating synthetic resin, and as shown in FIG. 1, includes multiple housing portions 41 that house the connection portions 21 of terminals 20. Each housing portion 41 includes a bottom wall 44 on which the connection portion 21 is placed, and a partition wall 45 that surrounds the connection portion 21 with a rectangular tube shape.

The partition wall 45 includes a pair of opposing wall portions 46A and 46B that extend along the arrangement direction of the power storage elements 50, and a pair of joining wall portions 49 that join the pair of opposing wall portions 46A and 46B. The opposing wall portions 46A and 46B include multiple withdrawal restriction pieces 47 that restrict withdrawal of the terminal 20 from the front face side (the side opposite to the power storage element 50). The withdrawal restriction pieces 47 project inward from inward faces of the pair of opposing wall portions 46A and 46B of the partition wall 45, and are formed with a cantilevered shape so as to be capable of elastic deformation. When the withdrawal restriction pieces 47 are bent and the connection portion 21 is arranged on the bottom wall 44, the withdrawal restriction pieces 47 then undergo restoring deformation, and the claw-shaped leading end portions of the withdrawal restriction pieces 47 oppose the front face of the connection portion 21, thus restricting withdrawal of the connection portion 21.

The wiring module 10 is formed by housing the connection portions 21 of terminals 20 in the housing portions 41 (FIG. 1), and a power storage module 12 is formed by mounting the wiring module 10 to the power storage element group 52 that includes the row of power storage elements 50, and then fastening nuts (not shown) to the electrode terminals 51. When this power storage module 12 is installed in a vehicle, the wiring module 10 is arranged such that the wire barrel 33 faces downward.

Next, actions and effects of the present embodiment will be described. The terminal-equipped electrical wire 11 according to the present embodiment is a terminal-equipped electrical wire 11 including an electrical wire 38 and a terminal 20 that is connected to the electrical wire 38, wherein the electrical wire 38 has a core wire that is covered by an insulation covering, the terminal 20 includes a metal cap portion 60 in which one end portion of a tubular portion 61 that has a tubular shape is sealed and another end portion of the tubular portion 61 is an opening portion 62, the terminal 20 is connected to the electrical wire 38 in a state where the cap portion 60 is placed over an end portion of the electrical wire 38, and an edge portion 63 of the opening portion 62 has an increased width in a diameter direction of the tubular portion 61.

According to the present embodiment, the opening portion 62 of the cap portion 60 has an increased width in the diameter direction of the tubular portion 61, and the gap 64 is formed between the opening portion 62 of the cap portion 60 and the electrical wire 38. The capillary phenomenon is suppressed by this gap 64. This consequently suppresses the case where a liquid such as water intrudes into the cap portion 60 through the gap between the opening portion 62 of the cap portion 60 and the electrical wire 38.

In the wiring module 10 according to the present embodiment, there are cases where water condensation forms on the surface of the connection portion 21 when there is a change in temperature or humidity. If this water flows and reaches the wire barrel 33, there is concern that it will reach the core wire as well. If water adheres to the core wire, there is concern of core wire erosion and the like. In the present embodiment, as described above, the cap portion 60 is placed over the core wire, thus suppressing the case where water intrudes into the cap portion 60 through the gap between the opening portion 62 of the cap portion 60 and the electrical wire 38. Accordingly, the case where water adheres to the core wire is suppressed.

Also, according to the present embodiment, the edge portion 63 of the opening portion 62 is bent outward in the diameter direction of the tubular portion 61. Accordingly, the gap 64 between the electrical wire 38 and the edge portion 63 of the opening portion 62 of the cap portion 60 can be set wider, and the capillary phenomenon is reliably suppressed.

Also, according to the present embodiment, the cap portion 60 is a member that is separate from the terminal 20, and the terminal 20 has the wire barrel 33 that is crimped in a state of wrapping around the cap portion 60.

According to the above configuration, the wire barrel 33 is crimped to the cap portion 60, thus electrically connecting the core wire and the terminal 20 to each other. Also, the terminal 20 and the cap portion 60 are separate members, and therefore the metal constituting the terminal 20 and the metal constituting the cap portion 60 can be different from each other.

Also, according to the present embodiment, the terminal 20 has the connection portion 21 that is to be connected to a connection partner, and the connection portion 21 and the cap portion 60 are electrically connected to each other. Accordingly, the connection partner and the electrical wire 38 can be electrically connected to each other.

Also, according to the present embodiment, the connection portion 21 is to be connected to an electrode terminal 51 of a power storage element 50. Accordingly, the electrode terminal 51 of the power storage element 50 and the electrical wire 38 can be electrically connected to each other.

Also, according to the present embodiment, the connection portion 21 connects electrode terminals 51 of power storage elements 50 to each other. Accordingly, electrode terminals 51 of power storage elements 50 can be electrically connected to each other, and the electrode terminals 51 and the electrical wire 38 can be electrically connected to each other.

Second Embodiment

Next, a second embodiment of the technology disclosed in the present specification will be described with reference to FIGS. 5 to 7.

Figure 5:
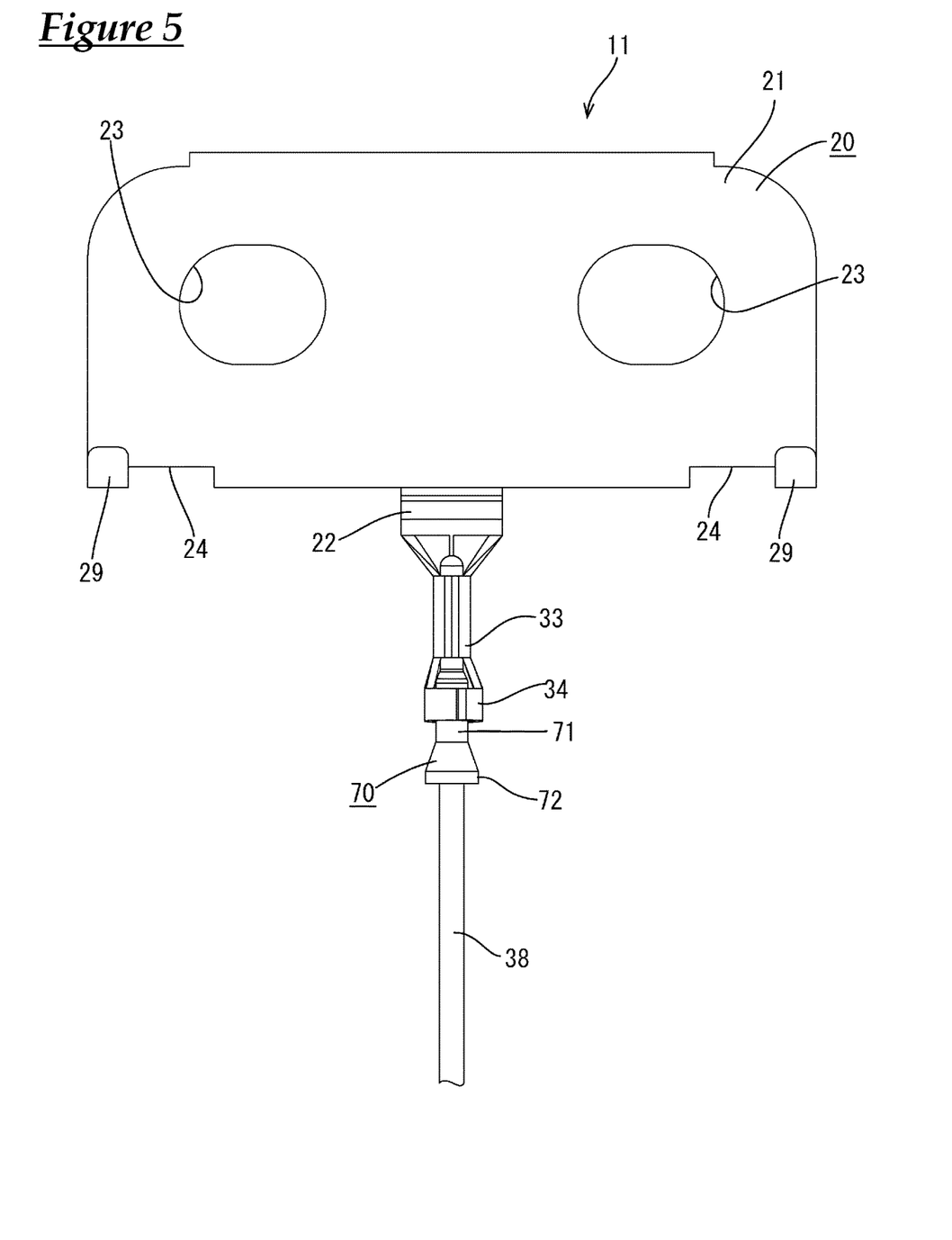
FIG. 5 is a plan view showing a terminal-equipped electrical wire according to a second embodiment.
Figure 6:
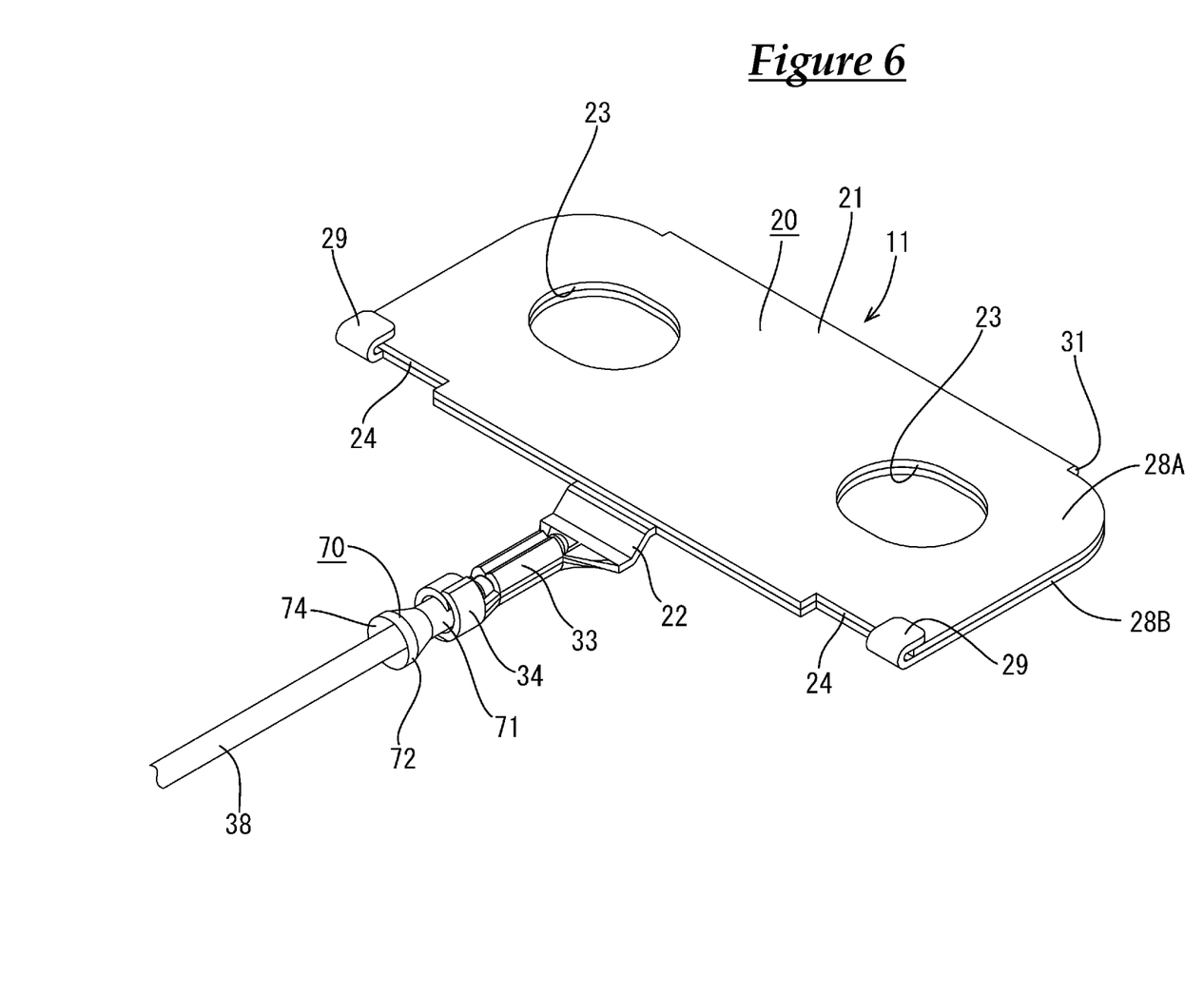
FIG. 6 is a perspective view showing the terminal-equipped electrical wire.

As shown in FIGS. 5 and 6, in a cap portion 70 according to the present embodiment, a portion of an opening portion 72 that is toward an end portion gradually increases in width outward in the diameter direction of a tubular portion 71 while extending in a direction away from the wire barrel 33.

Figure 7:
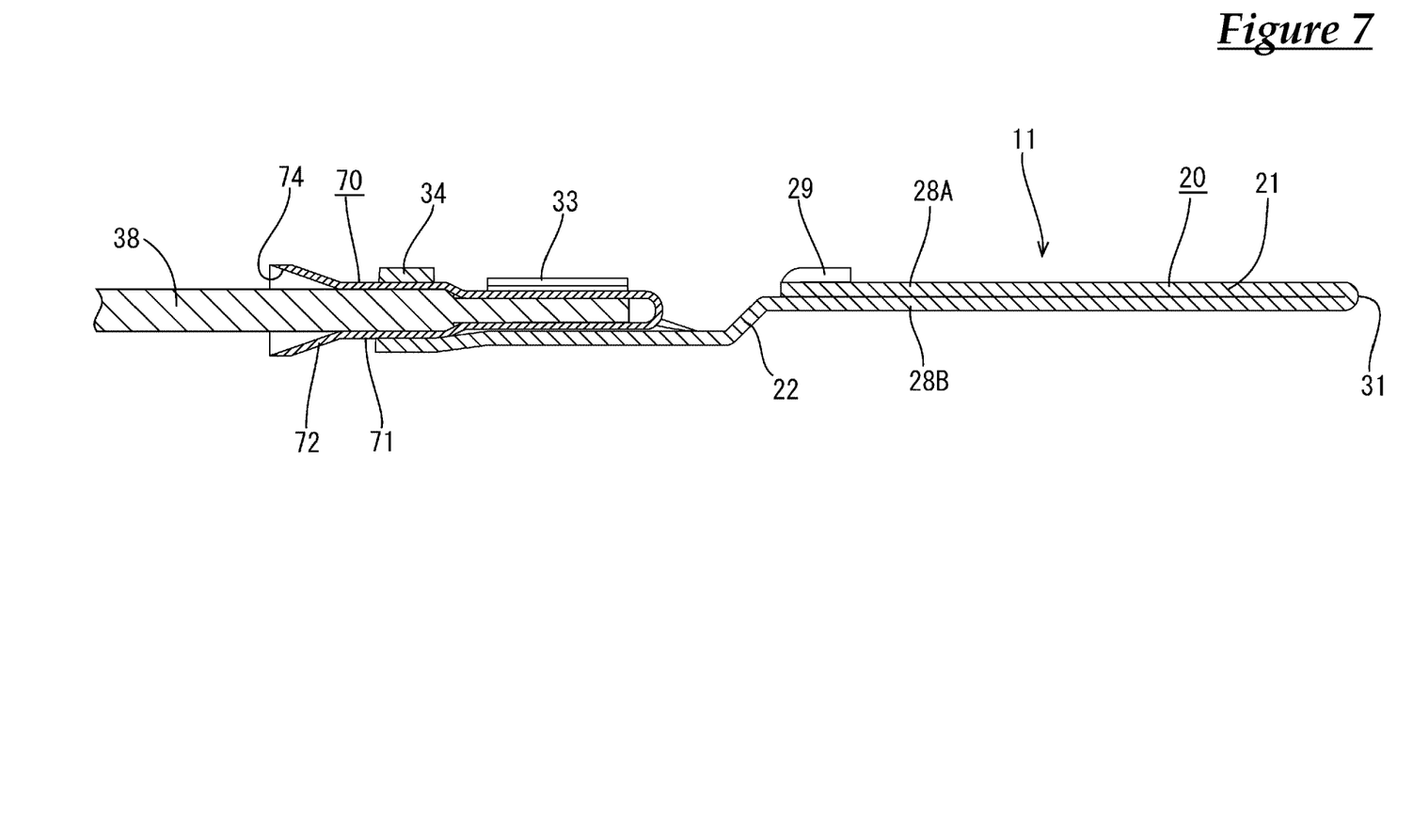
FIG. 7 is a cross-sectional view showing the terminal-equipped electrical wire.

As shown in FIG. 7, a gap 74 is formed between the opening portion 72 of the cap portion 70 and the insulation covering, and the distance between the cap portion 70 and the insulation covering gradually increases along the opening direction of the opening portion 72 (leftward in FIG. 7).

Configurations other than those described above are substantially the same as in the first embodiment, and like members are denoted by like reference signs, thus omitting redundant descriptions.

According to the present embodiment, the gap 74 between the cap portion 70 and the insulation covering can be formed by the simple technique of forming the edge of the opening portion 72 of the cap portion 70 so as to increase in width in the opening direction. It is therefore possible to suppress the capillary phenomenon in the opening portion 72 of the cap portion 70.

Third Embodiment

Figure 8:
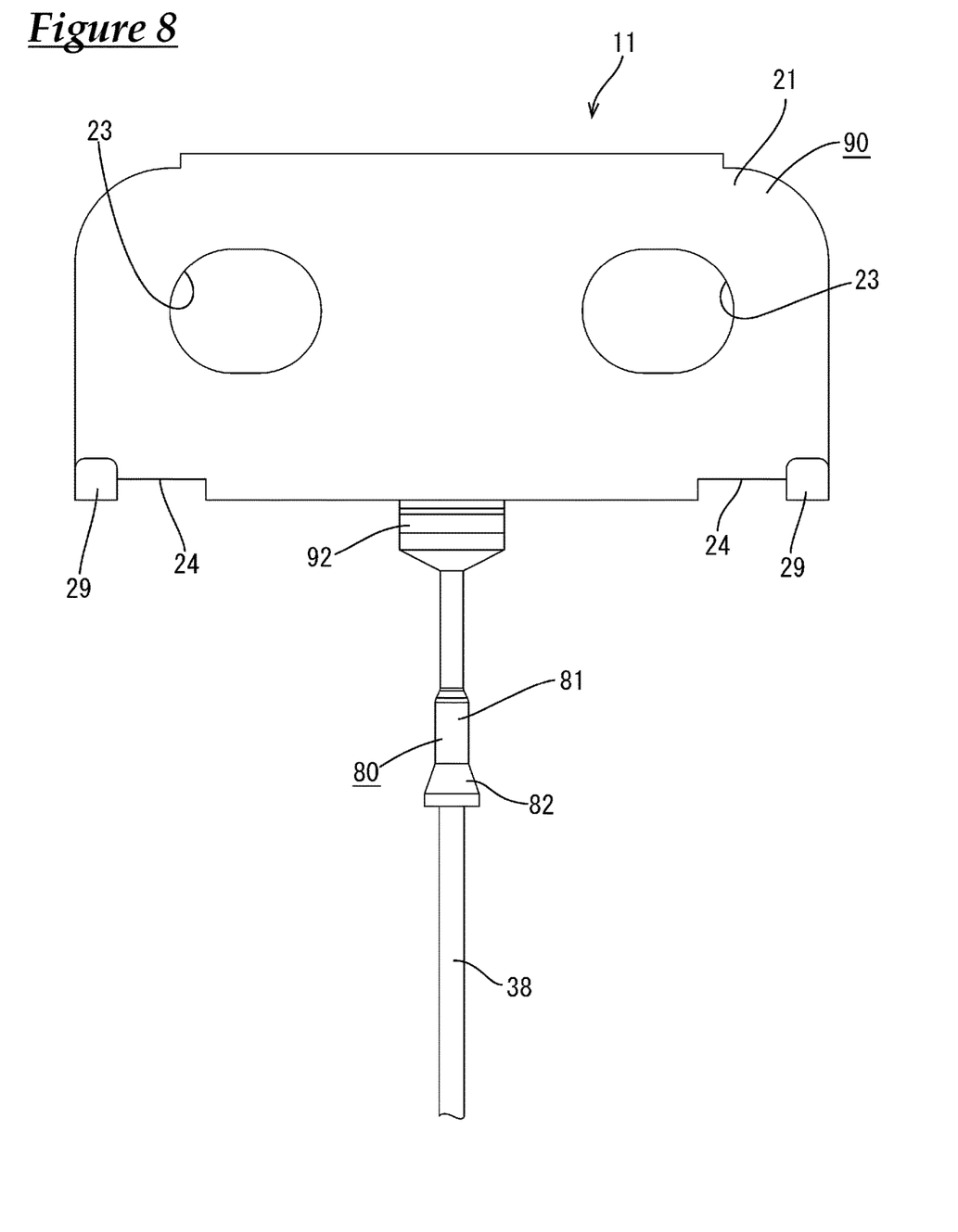
FIG. 8 is a plan view showing a terminal-equipped electrical wire according to a third embodiment.
Figure 9:
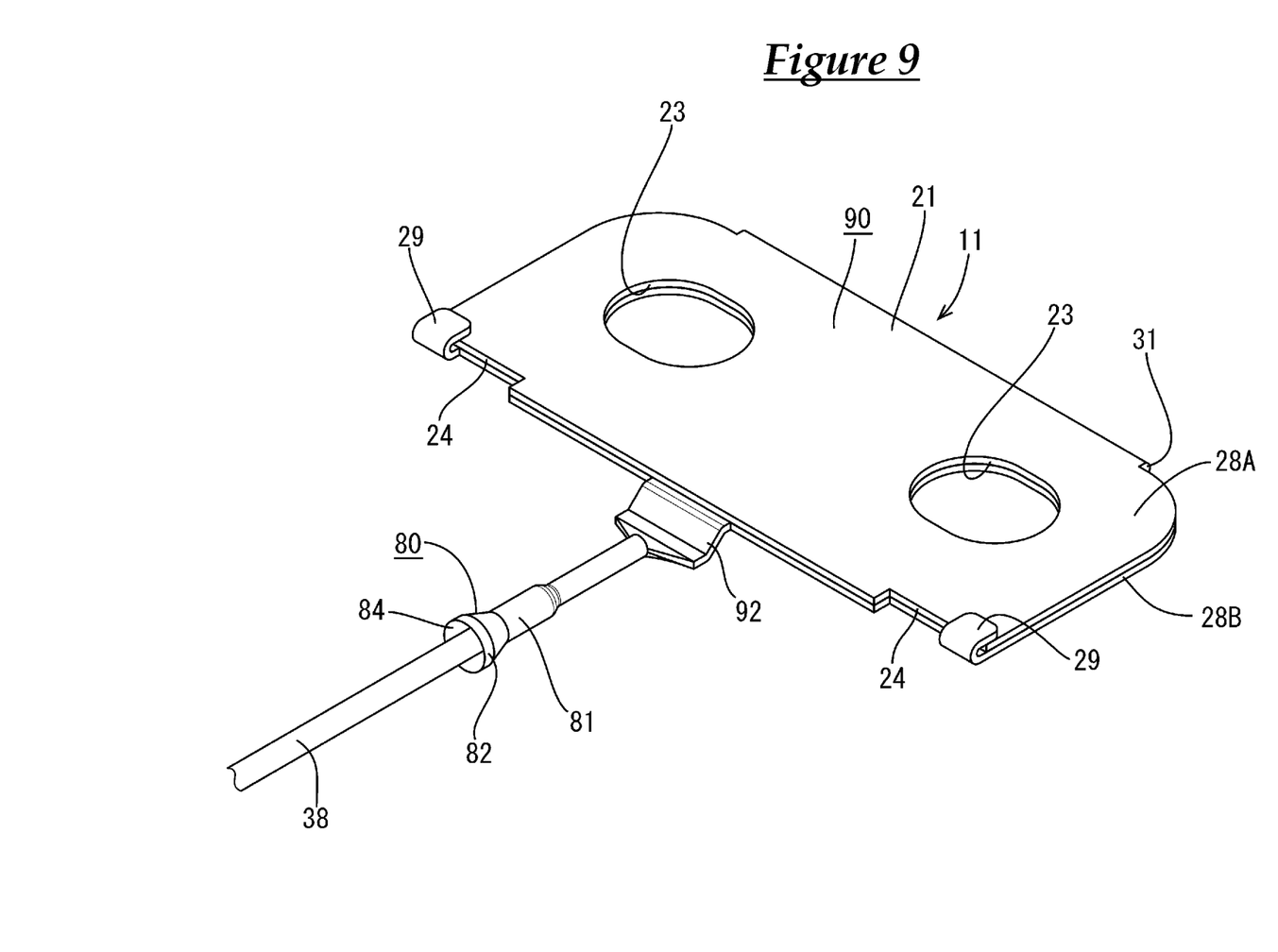
FIG. 9 is a perspective view showing the terminal-equipped electrical wire.

Next, a third embodiment of the technology disclosed in the present specification will be described with reference to FIGS. 8 to 10.

In the present embodiment, a terminal 90 and a cap portion 80 are integrated as a single body. Specifically, the cap portion 80 is formed so as to be continuous with a joining portion 92 of the terminal 90.

The cap portion 80 according to the present embodiment is obtained by the lateral edges of an elongated flat plate, which is continuous with the joining portion 92, being bent into a tubular shape such that the lengthwise direction of the flat plate becomes the axial direction. The edges of the lateral edges of the flat plate are abutted against each other and bonded by a known technique such as welding, brazing, or soldering, thus obtaining a tubular portion 81 that is tube shaped and is sealed at one end portion, and has an opening portion 82 at the other end portion. The above-described joint portion is not shown in the figures.

In the present embodiment, the metal constituting the terminal 90 and the metal constituting the cap portion 80 are the same.

Figure 10:
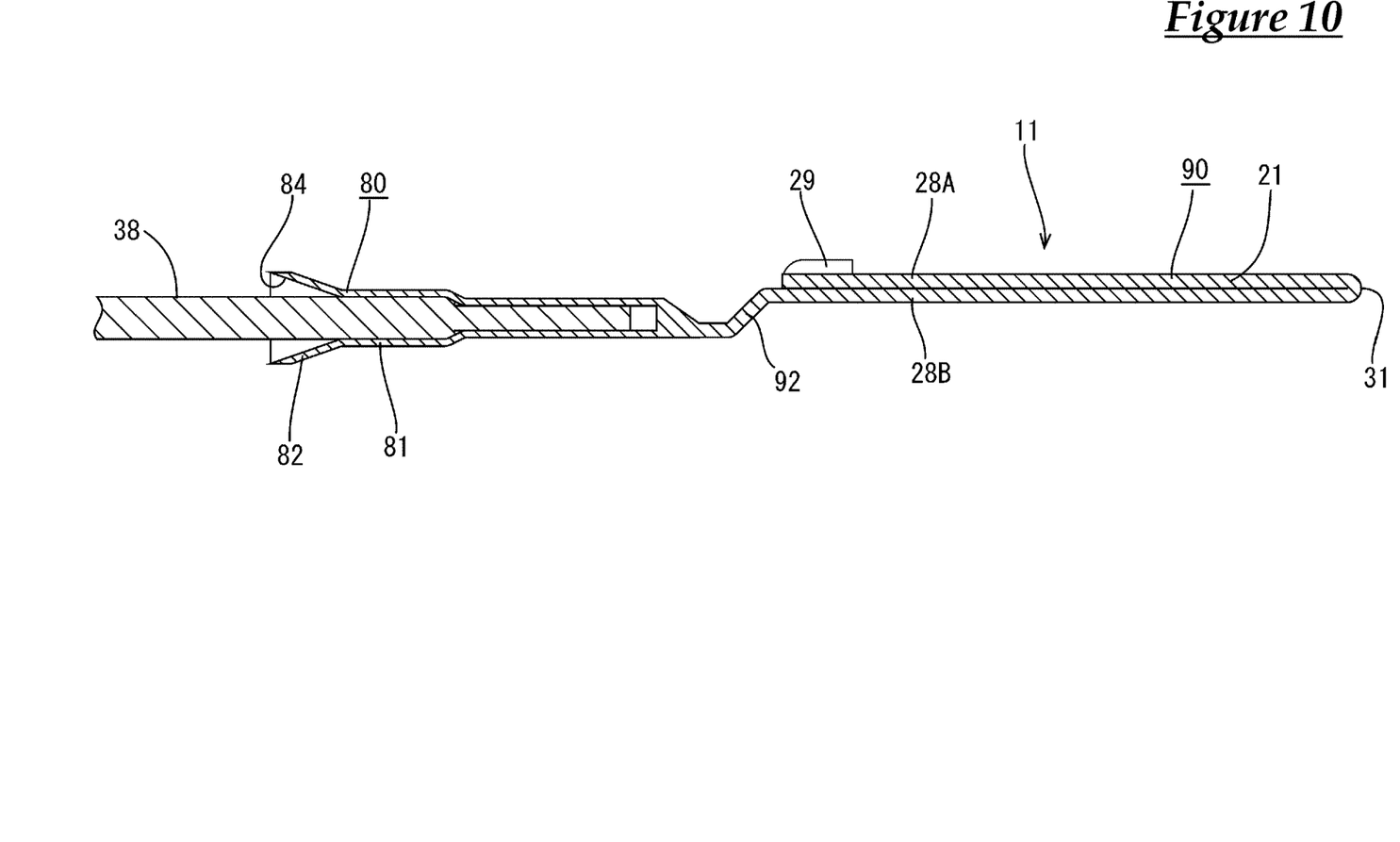
FIG. 10 is a cross-sectional view showing the terminal-equipped electrical wire.

As shown in FIG. 10, the portion of the tubular portion 81 that is placed over the core wire of the electrical wire 38 is crimped inward in the diameter direction of the tubular portion 81. Accordingly, the core wire and the terminal 90 are electrically connected to each other.

Also, the portion of the tubular portion 81 that is placed over the insulation covering of the electrical wire 38 is crimped inward in the diameter direction of the tubular portion 81. Accordingly, the electrical wire 38 is held by the cap portion 80.

The opening portion 82 of the cap portion 80 increases in width outward in the diameter direction. Specifically, the opening portion 82 is formed so as to gradually increase in width along the opening direction (leftward in FIG. 10).

Configurations other than those described above are substantially the same as in the first embodiment, and like members are denoted by like reference signs, thus omitting redundant descriptions.

According to the present embodiment, the cap portion 80 is integrated as a single body with the terminal 90. Accordingly, the number of parts can be reduced compared to the case where the terminal 90 and the cap portion 80 are separate members.

Other Embodiments

The technology disclosed in the present specification is not intended to be limited to the embodiments described using the above descriptions and drawings, and the technical scope of the technology disclosed in the present specification also encompasses various embodiments such as the following, for example.

Although the through-holes 23 for the passage of the electrodes of the power storage elements 50 are formed in the connection portion 21 in the embodiments, the technology of the present specification is not limited to this, and the connection portion may have a male tab shape, may be shaped as a tube that has an elastic piece inside, or can have any shape as necessary.

The connection portion 21 can be omitted, and it is possible to employ a so-called splice terminal structure in which multiple electrical wires 38 are electrically connected by inserting the core wires of the electrical wires 38 into the cap portion 60, for example.

Although the power storage element 50 is an electric cell above, it may be a capacitor.

Although a pair of through-holes 23 for passage of the electrode terminals 51 of the power storage elements 50 are formed in the connection portion 21 in the embodiments, the technology of the present specification is not limited to this, and a configuration is possible in which one through-hole for the passage of one electrode terminal 51 of a power storage element 50 is formed in the connection portion 21.

Although the cap portion is crimped to the core wire that is exposed in the end portion of the electrical wire in the embodiments, the technology of the present specification is not limited to this, and the cap portion and the core wire may be welded by a known technique such as ultrasonic welding or resistance welding. Also, a configuration is possible in which the cap portion and the core wire are connected by soldering or brazing, in which melted solder or brazing filler is injected into the cap portion and then allowed to harden.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wiring module
11 Terminal-equipped electrical wire
20, 90 Terminal
21 Connection portion
33 Wire barrel
38 Electrical wire
40 Insulating protector
41 Housing portion
50 Power storage element
51 Electrode terminal
60, 70, 80 Cap portion
61, 71, 81 Tubular portion
62, 72, 82 Opening portion

The invention claimed is:

1. A terminal-equipped electrical wire comprising an electrical wire and a terminal that is connected to the electrical wire, wherein the terminal includes a metal cap portion having a tubular portion that is tubular in shape, the tubular portion has a first end portion that is sealed and a second end portion that is open, the terminal is connected to the electrical wire in a state where the cap portion is placed over an end portion of the electrical wire, the electrical wire has an insulation covering that is stripped away from at least part of the end portion of the electrical wire to expose a core wire, the second end portion, toward an edge where the tubular portion is open, has an increased width in a diameter direction of the tubular portion relative to the first end portion where the tubular portion is sealed, and the cap portion is placed over the electrical wire so that the first end portion contacts the core wire and forms an electrical connection between the electrical wire and the terminal, and so that the second end portion forms a gap between the cap portion and the insulation covering of the electrical wire toward the edge where the tubular portion is open and has the increased width in the diameter direction.

2. The terminal-equipped electrical wire according to claim 1, wherein an edge portion of the second end portion is bent outward in the diameter direction of the tubular portion.

3. The terminal-equipped electrical wire according to claim 1, wherein the cap portion is a member that is separate from the terminal, and the terminal has a wire barrel that is crimped in a state of wrapping around the cap portion.

4. The terminal-equipped electrical wire according to claim 1, wherein the cap portion is integrated with the terminal as a single body.

5. The terminal-equipped electrical wire according to claim 1, wherein the terminal has a connection portion that is to be connected to a connection partner, and the connection portion and the cap portion are electrically connected.

6. The terminal-equipped electrical wire according to claim 5, wherein the connection portion is to be connected to an electrode terminal of a power storage element.

7. A wiring module comprising:
the terminal-equipped electrical wire according to claim 6; and
an insulating protector having a housing portion that houses the connection portion.

8. The terminal-equipped electrical wire according to claim 5, wherein the connection portion connects electrode terminals of power storage elements to each other.

9. A wiring module comprising:
the terminal-equipped electrical wire according to claim 8; and
an insulating protector having a housing portion that houses the connection portion.

10. A terminal-equipped electrical wire comprising an electrical wire and a terminal that is connected to the electrical wire, wherein the terminal includes a plate-shaped connection portion and a metal cap portion that has a tubular portion that is tubular in shape, the tubular portion has a first end portion that is sealed and a second end portion that is open, the cap portion is a member that is separate from the plate-shaped connection portion, and the plate-shaped connection portion includes an insulation barrel and a wire barrel;

the terminal is connected to the electrical wire in a state where the cap portion is placed over an end portion of the electrical wire, the electrical wire has an insulation covering that is stripped away from at least part of the end portion of the electrical wire to expose a core wire, the second end portion of the tubular portion, toward an edge that is open, is bent outward in a diameter direction of the tubular portion and has an increased width in the diameter direction of the tubular portion relative to the first end portion of the tubular portion that is sealed, the cap portion is placed over the electrical wire so that the first end portion contacts the core wire and forms an electrical connection between the electrical wire and the cap portion, and so that the second end portion forms a gap between the tubular portion and the insulation covering of the electrical wire toward the edge that is open and has the increased width in the diameter direction, the cap portion is at least partially surrounded by the insulation barrel and the wire barrel of the plate-shaped connection portion, the wire barrel is crimped to the first end portion of the tubular portion at a location in which the core wire is exposed, and the insulation barrel is provided at a part of the cap portion that contacts the insulation covering of the electrical wire, and the plate-shaped connection portion includes one or more through holes, a first plate portion, a second plate portion, and a hinge portion that connects the first plate portion and the second plate portion in a manner so that the first plate portion is capable of being folded back over onto the second plate portion so that the first plate portion and the second plate portion are stacked.

* * * * *